(12) United States Patent
Hayward et al.

(10) Patent No.: US 7,641,026 B1
(45) Date of Patent: Jan. 5, 2010

(54) BRAKE ASSEMBLY

(75) Inventors: Dennis Richard Hayward, Bedfordshire (GB); Paul Harris, Bedfordshire (GB); David Bonniemann, Buckinghamshire (GB)

(73) Assignee: Goodrich Control Systems Limited (GB)

( * ) Notice: Subject to any disclaimer, the term of this patent is extended or adjusted under 35 U.S.C. 154(b) by 71 days.

(21) Appl. No.: 09/595,201

(22) Filed: Jun. 16, 2000

(30) Foreign Application Priority Data

Jun. 17, 1999 (GB) ................................. 9914003.0
Nov. 12, 1999 (GB) ................................. 9926717.1

(51) Int. Cl.
*B60L 7/00* (2006.01)
(52) U.S. Cl. ...................... 188/161; 188/32; 188/251 A
(58) Field of Classification Search ................. 188/161, 188/162, 163, 171, 216, 72.3, 251 A, 158, 188/156, 73.31, 73.32, 72.1, 71.1, 251 M; 310/75 R, 77, 93
See application file for complete search history.

(56) References Cited

U.S. PATENT DOCUMENTS

| | | | | |
|---|---|---|---|---|
| 2,983,339 A | * | 5/1961 | Neff ............................ | 188/171 |
| 3,672,936 A | | 6/1972 | Enrenreich | |
| 4,096,404 A | | 6/1978 | Sukhanov et al. | |
| 4,290,510 A | | 9/1981 | Warren | |
| 4,684,838 A | | 8/1987 | Casanova ..................... | 310/93 |
| 4,715,486 A | * | 12/1987 | Burgdorf et al. ......... | 188/251 A |
| 4,921,078 A | * | 5/1990 | Sommer ..................... | 188/171 |
| 5,121,018 A | | 6/1992 | Oldakowski | |
| 6,119,825 A | * | 9/2000 | Nisley .......................... | 188/171 |
| 6,161,659 A | * | 12/2000 | Maurice ..................... | 188/171 |

FOREIGN PATENT DOCUMENTS

| | | |
|---|---|---|
| DE | 11 09 260 B | 6/1961 |
| GB | 959 348 A | 5/1964 |
| GB | 2 155 809 | 10/1985 |
| WO | WO 92/20080 | 11/1992 |

* cited by examiner

*Primary Examiner*—Pam Rodriguez
(74) *Attorney, Agent, or Firm*—Andrus, Sceales, Starke & Sawall, LLP

(57) ABSTRACT

A brake assembly for a motor, the brake assembly comprising a stack of brake elements, at least one of which is rotatable with an output shaft of the motor, in use, and at least one of which is non-rotatable relative to a housing, and actuator means controlling the magnitude of a compressive load applied to the brake elements, wherein the brake elements are provided, at least in part, with a surface coating which raises the coefficient of friction of the brake elements to a value greater than 0.2. The invention also relates to a brake assembly comprising a plurality of brake elements and an electromagnetic actuator arranged to permit control of a compressive load applied to the brake elements, wherein the actuator includes a winding located such that the brake elements are accessible without requiring removal of the winding from the motor.

15 Claims, 3 Drawing Sheets

BRAKE ASSEMBLY

TECHNICAL FIELD

This invention relates to a brake assembly. The invention is particularly suitable for use with an electric motor to slow or stop the motor or to hold the motor in a selected position, and is suitable for use in aerospace applications.

BACKGROUND OF THE INVENTION

Electric motors are used in a range of aerospace applications, for example to drive hatches or doors between their open and closed positions or to drive flaps or the like. In some applications, where rapid movement is to be achieved, the motor must be able to rotate at very high speeds. It is important, in such applications, to provide a brake assembly to permit rapid deceleration of the motor to avoid damage to the aircraft when the hatch, door, flap or other component approaches the end of its range of movement, or to stop the component in a desired location. Additionally, the brake assembly may be required to operate as a primary or secondary holding means to prevent movement of, for example, the hatch or door away from a predetermined position.

In a typical brake assembly, for example as described in U.S. Pat. No. 4,921,078, a plurality of brake discs are provided, alternate ones of the brake discs being rotatable with the output of the motor, the remaining discs being non-rotatable. An electromagnetic actuator is provided to control the compressive load applied to the discs, thereby controlling the magnitude of a braking force applied to the motor. The discs are typically formed from steel, phosphor bronze or a combination of both and typically have a friction coefficient falling within the range 0.1 to 0.2. Brake assemblies of this type operate whilst immersed in oil to avoid excessive wear or for cooling purposes.

For a number of applications, such a brake assembly provides an adequate braking force. However, in aerospace applications, where component weight and size are of great importance, the number and size of traditional brake discs required may result in an undesirably large and heavy assembly. Also, in some high load applications, for example, it is desirable to be able to apply a greater braking force, for example to stop a motor operating at speeds of the order of 15,000 rpm within a fraction of a second. It is further desirable to provide a brake assembly which is readily serviceable and which requires little setting or adjustment upon assembly, and which may be operated satisfactorily without being immersed in oil.

SUMMARY OF THE INVENTION

According to an aspect of the invention there is provided a brake assembly for a motor, the brake assembly comprising a stack of brake elements, at least one of which is rotatable with an output shaft of the motor, in use, and at least one of which is non-rotatable relative to a housing, and actuator means controlling the magnitude of a compressive load applied to the brake elements, wherein the brake elements are provided, at least in part, with a surface coating which raises the coefficient of friction of the brake elements to a value greater than 0.2.

Preferably, the surface coating raises the coefficient of friction to a value of at least 0.5. The coefficient of friction preferably falls within the range 0.5 to 0.6.

The provision of such a surface coating dramatically improves the brake efficiency of the assembly, permitting the use of a smaller number of brake elements than in the conventional arrangements, resulting in a significant weight reduction. Further, the means controlling the magnitude of the compressive load can be of reduced weight as the magnitude of the compressive load applied to the brake elements can be reduced.

The surface coating is preferably tungsten carbide which may be applied using a detonation gun deposition technique and conveniently forms a layer of thickness falling within the range 0.025" to 0.050" (0.64 mm to 1.27 mm).

Preferably, the stack of brake elements may take the form of a first brake element which is rotatable with the output shaft of the motor, in use, and a second brake element which is non-rotatable relative to the housing. In one embodiment of the invention, the second brake element may form part of a cap forming part of the housing.

At least one of the brake elements may conveniently take the form of a brake disc.

For some applications it may be necessary to orient the motor in such a way that the axis of the output shaft is substantially vertical. This is the case, for example, if the motor is employed to drive a wing flap on an aircraft. In such circumstances, the brake assembly preferably includes means for preventing contact between the first and second brake elements when the actuator means are actuated. Thus, even if the motor is oriented such that the output shaft is arranged substantially vertically and the first brake element is urged towards the second brake element under the influence of gravity, no contact will occur between the first brake element and the second brake element when the brake is actuated. This prevents an undesirable drag force being applied to the motor during points in the operation when it is desired for the motor to rotate freely. The motor can therefore be used in any orientation.

The actuator means may comprise an electromagnetic actuator arranged to act against a primary spring. In such an arrangement, it may be desirable to form the brake elements from a non-magnetic material.

Conveniently, the means for preventing contact between the first and second brake elements includes biasing means for biasing the first brake element away from the second brake element, the biasing means providing a biasing force which exceeds the weight of the first brake element.

The biasing means may conveniently take the form of a secondary spring, the spring force due to the secondary spring being sufficient to overcome the weight of the first brake element but being less than the spring force due to the primary spring.

The means for preventing contact between the first and second brake elements may further comprise a stop member arranged to limit axial movement of the first brake element relative to an armature forming part of the actuator means.

Conveniently, the stop member may take the form of a shoulder provided on a rotor shaft which is rotatable with the output shaft of the motor. The rotor shaft may preferably form an integral part of the output shaft.

The rotor shaft may be provided with an abutment member, the secondary spring being located between the abutment member and the first brake element. Conveniently, the abutment member takes the form of a flange provided on the rotor shaft.

In the arrangement of U.S. Pat. No. 4,921,078, the electromagnetic actuator is located such that the brake discs are located between the armature of the actuator and the motor with which the brake assembly is associated. As a result, during servicing the actuator must be removed to gain access to the brake discs. The servicing operation is therefore complex and wasteful as, once removed, the whole assembly, including the actuator may be replaced, unnecessarily, with a new assembly.

According to another aspect of the invention there is provided a brake assembly for a motor, the brake assembly comprising a plurality of brake elements and an electromagnetic actuator arranged to permit control of a compressive load applied to the brake elements, wherein the actuator includes a winding located such that the brake elements are accessible without requiring removal of the winding from the motor.

The winding is conveniently located between the brake elements and the motor.

Preferably, the brake elements form part of a module which can be removed from the motor and the remainder of the brake assembly as a unit. The module may further include an armature forming part of the actuator.

By manufacturing the module relatively accurately, the brake elements can be replaced by replacing the module with a new module, no significant setting or adjustment being required before the brake assembly is suitable for use.

BRIEF DESCRIPTION OF THE DRAWINGS

The invention will further be described, by way of example, with reference to the accompanying drawings, in which:—

DETAILED DESCRIPTION OF THE PREFERRED EMBODIMENT

Figure 1:
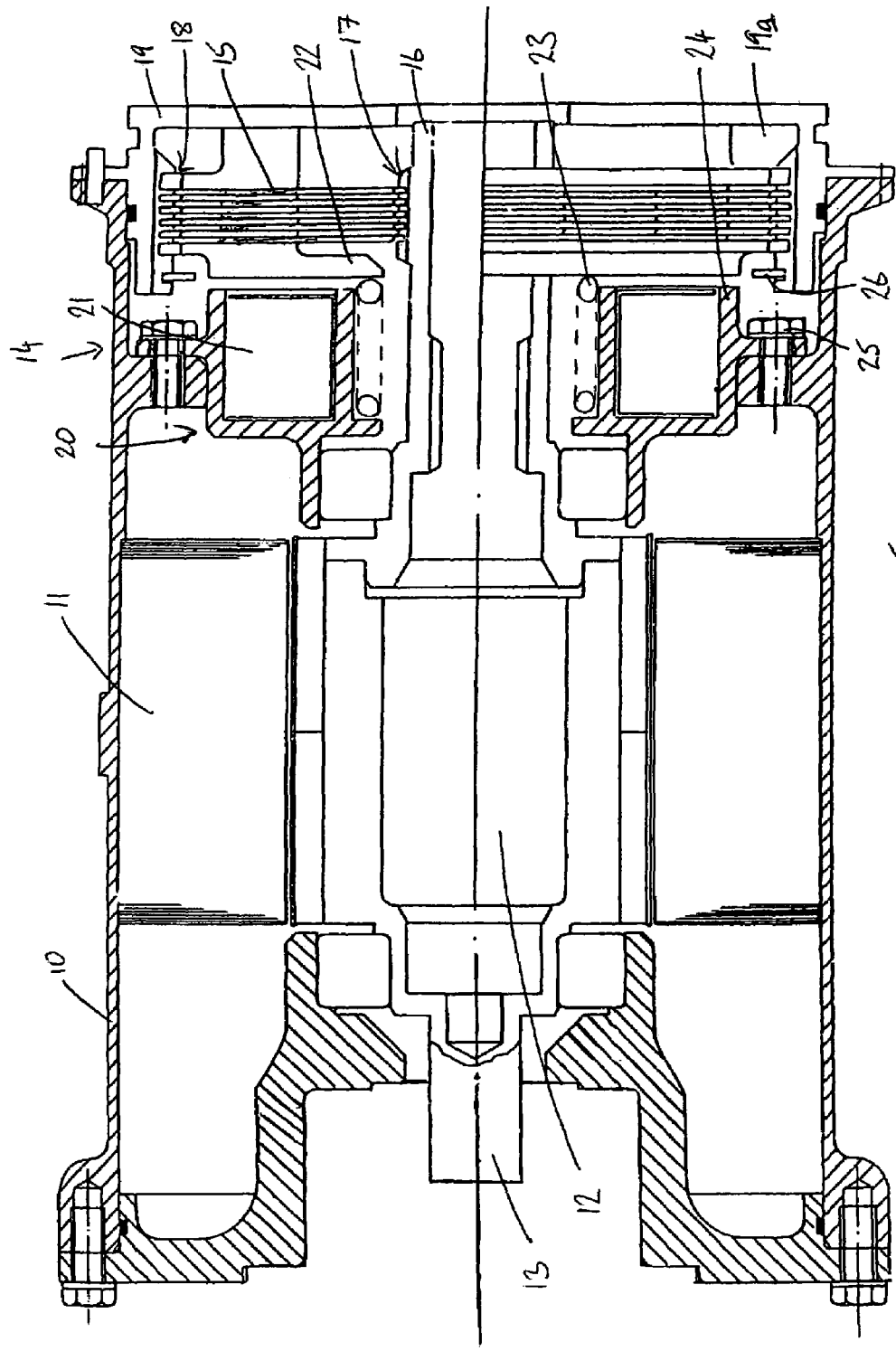
FIG. 1 is a sectional view illustrating a motor and a brake assembly in accordance with an embodiment of the invention.

FIG. 1 illustrates a motor which comprises a housing 10 within which a stator 11 is mounted. A rotor 12 is rotatable under the influence of a magnetic field generated, in use, by the stator. The rotor 12 includes an output shaft 13 which projects from an end of the housing 10 which, in use, is coupled through a suitable gearing arrangement to an input of a device to be operated by the motor. The device may, for example, take the form of a rotary actuator which is used to drive a hatch or door of an aircraft between a closed position and an open position. As described hereinbefore, there may be a requirement for the door to move between its fully closed position and its fully open position within a short period of time, and hence the motor must be capable of operating at a high speed. For example, the motor may be intended to operate at a speed of the order of 15,000 rpm through a high ratio gearbox. The motor may typically have an output power in excess of 25 kW. It will be appreciated, however, that the invention is suitable for use with other types of electric motor, and those having much lower output power whilst still giving improvements in weight, size and serviceability.

Where the door or hatch is to be moved between its fully closed and fully open positions at a high speed, it will be appreciated that when the door approaches one of its extreme positions, in order to avoid damage to the aircraft to which the door or hatch is mounted, it is desirable to brake the movement of the door or hatch, and this is conveniently achieved by using a brake assembly associated with the motor to slow or stop the rotation of the motor. This is achieved, in the arrangement illustrated in the accompanying drawings, using a brake assembly 14 which comprises a stack of brake elements in the form of brake discs 15.

Figure 2:
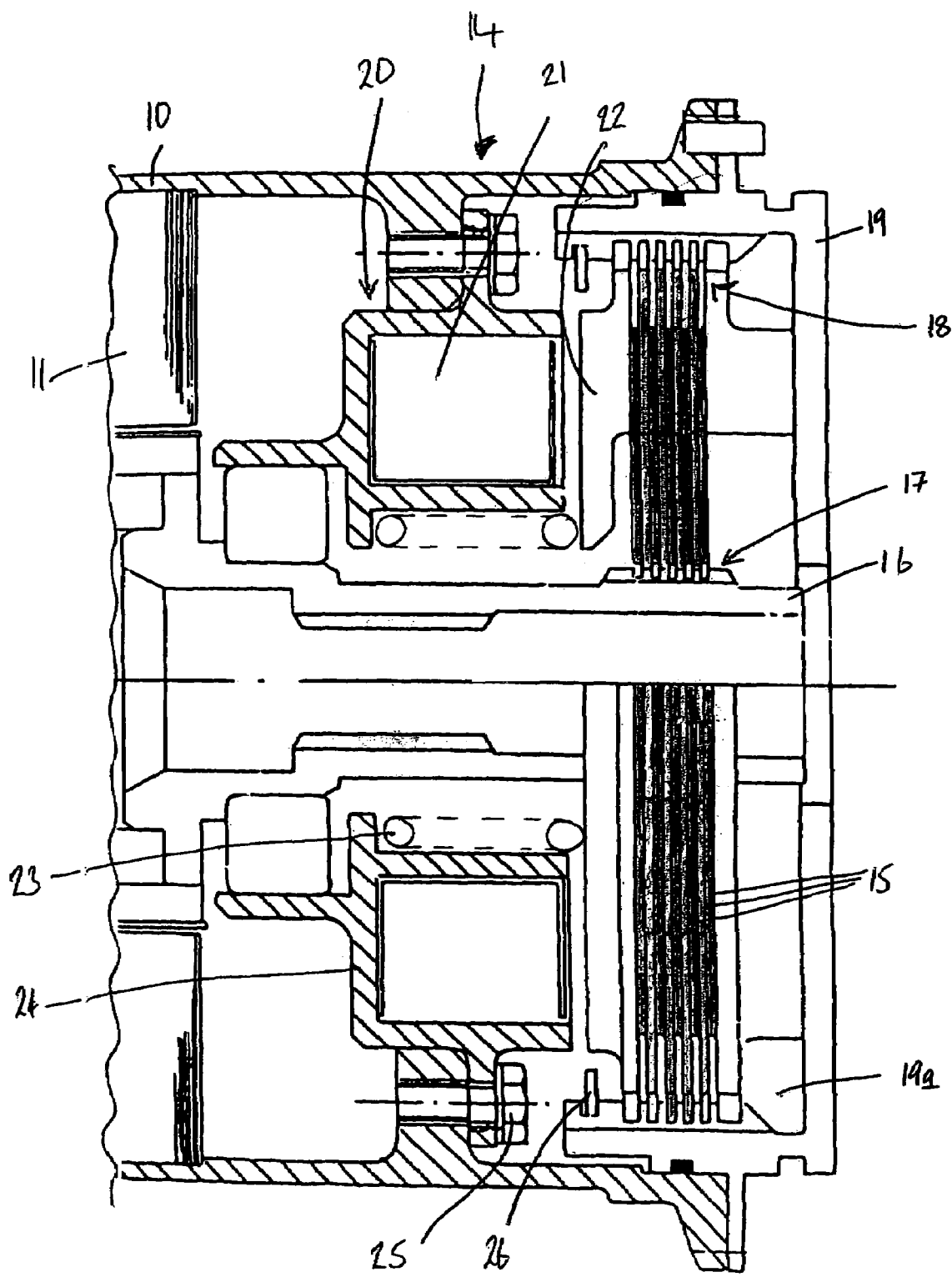
FIG. 2 is an enlargement of part of FIG. 1.

As illustrated most clearly in FIG. 2, alternate ones of the brake discs 15 are keyed to a shaft 16 which is rotatable with the rotor 12 of the motor through a spline arrangement 17. The remaining brake discs 15 are keyed through a spline arrangement 18 to part of a cap 19 which is non-rotatably mounted upon the housing 10 of the motor using any suitable technique, for example using bolts. The nature of the spline arrangement 17 is such that the discs 15 which are keyed to the shaft 16 are rotatable with the shaft 16 and are free to move axially relative to the shaft 16 by a predetermined, limited distance. Similarly, the spline arrangement 18 is arranged such that the discs 15 which are keyed to the cap 19 are capable of sliding, axially, through a limited distance relative to the cap 19, relative rotation between those discs 15 and the cap 19 being prevented. The distance through which the discs 15 can move away from the motor is limited by means of an anvil 19a forming part of or carried by the cap 19.

Within the housing 10, an electromagnetic actuator 20 forming part of the brake assembly 14 is mounted. The actuator 20 comprises an energization coil or winding 21 which is arranged such that energization thereof attracts an armature 22 towards the winding 21 against the action of a biasing spring 23. As illustrated, the actuator 20 includes a support member 24 which carries the winding 21 and which serves as an abutment for the spring 23. The support member 24 further carries a bearing which guides the shaft 16 for rotary movement within the housing 10. The support member 24 is secured to the housing 10 by means of bolts 25. It will be appreciated, however, that any suitable technique may be used to secure the support member 24 to the housing 10.

The brake discs 15 are conveniently constructed from a non-magnetic alloy, for example beryllium copper, to which a surface coating has been applied to increase the coefficient of friction of the brake discs 15. For example, the coating may comprise a tungsten carbide material coating which has been applied to form a layer of thickness falling within the range 0.64 to 1.27 mm, for example using a detonation gun deposition technique. A suitable material for the coating is a tungsten carbide material sold by Union Carbide under the name UCAR WL 1N40. The application of such a surface coating raises the coefficient of friction of the brake discs to a value falling within the range 0.5 to 0.6. As a result, braking efficiency is improved, and consequently, the number of brake discs which must be provided in order to achieve a desired braking effect can be reduced, resulting in a reduction in the weight and size of the brake assembly, compared to the conventional arrangements. Further, the surface coating has particularly advantageous wear resistance which enables the brake assembly to be operated without being immersed in oil.

In use, with the winding 21 de-energized, the spring 23 biases the armature 22 to apply a compressive load to the brake discs 15, the brake discs 15 being compressed between the armature 22 and the anvil 19a. The compressive load applied to the brake discs 15 by the spring 23 applies a braking force to the shaft 16, countering rotation thereof, and hence to the rotor 12 of the motor. Energization of the winding 21 attracts the armature 22 towards the winding 21 countering the effect of the spring 23. As a result, the magnitude of the compressive load applied to the brake discs 15 is reduced, thus reducing the magnitude of the braking force applied to the shaft 16 and rotor 12.

In use, where the motor is being used to drive, for example, a hatch or door between its closed and open positions, the winding 21 is energized prior to operation of the motor. The energization of the winding 21 reduces the magnitude of the compressive load applied to the brake discs 15, thus reducing the magnitude of a braking load applied to the motor. Operation of the motor then takes place as usual. When it is determined that the door or hatch is approaching its limit of permitted movement, the winding 21 is de-energized, the action of the spring 23 applying a relatively large magnitude compressive force to the brake discs 15, increasing the magnitude of the braking force applied to the shaft 16 and motor. It is thought that the brake arrangement illustrated in the accompanying drawings will be able to stop a motor which is operating at a speed of the order of 15,000 rpm within a fraction of a second.

The use of a tungsten carbide coating not only increases the friction coefficient of the brake discs 15, but also is able to withstand high temperatures, in the region of 1,000° C., temperatures of this order being generated upon repeated use of the brake assembly. Further, as described hereinbefore, the number of brake elements 15 can be reduced compared to a typical arrangement. The increased braking efficiency further permits an actuator 20 of reduced dimensions and weight to be used in conjunction with a spring 23 of reduced rate to achieve the necessary braking effect as the magnitude of the compressive load necessary to achieve the desired braking effect is reduced. As a result, the size and weight of the brake assembly can be substantially reduced compared to conventional designs having similar performance.

As a result of the increased coefficient of friction of the brake discs 15, it is particularly desirable to avoid any significant contact between the surfaces of the discs 15 at points in the operation of the motor in which the brake is not being applied as such contact would impede operation of the motor and generate additional heat.

One potential problem that exists in brake arrangements is, where the armature 22 does not fully contain the magnetic flux generated by the winding 21, in use, the stray flux may cause the brake discs 15 to be attracted towards the winding 21, where the brake discs 15 are formed from a magnetic material. As a result, the discs 15 may move into engagement with one another, applying a braking force to the motor and generating heat. These effects are undesirable and should be avoided if possible. In the construction described hereinbefore, the brake discs 15 are constructed from a non-magnetic alloy, thus the discs will not be attracted towards one another by the energization of the winding 21. However, where it is possible to fully contain the magnetic flux generated by the winding 21, in use, or where contact between the brake discs 15 can be tolerated or avoided using an alternative technique, then a stainless steel alloy or other magnetic material could be used for the brake discs 15. The use of a stainless steel alloy is preferred for reasons of cost and durability.

A further advantage of the arrangement illustrated in the accompanying drawings is that, where the brake assembly requires servicing, then the cap 19 may be removed from the housing 10. The brake assembly is designed such that removal of the cap 19 from the housing 10 results in the armature 22 and all of the brake discs 15 being removed from the remainder of the brake assembly 14, the removal of the cap causing the brake discs 15 which, in use, are keyed through the spline arrangement 17 to the shaft 16 to become disengaged therefrom. As illustrated in FIG. 1 and FIG. 2, a retainer member 26 is carried by the cap 19, the retainer member 26 preventing accidental disengagement of the brake discs 15 from the cap 19. The cap 19, brake discs 15 and armature 22 can therefore be removed from the motor and the remainder of the brake assembly as a single unit or module. During normal servicing, it is unlikely that the winding 21 will require replacement or maintenance, thus the support member 24 can be left in position.

Once the module including the cap 19 and the brake discs 15 have been removed from the housing 10, the spring 23 can be removed and replaced, if desired, and a replacement module secured to the housing 10. The module can be constructed to reasonably tight tolerances such that once a replacement module is secured to the housing 10 after appropriate replacement of the spring 23, no setting or adjustment of the brake assembly needs to take place before the brake assembly can be operated, the only setting which is necessary being to align the rotating brake discs 15 prior to positioning the module so that the relevant discs 15 may be keyed to the shaft 16. As the brake assembly is designed in such a manner that only the module consisting of the cap 19, brake discs 15 and armature 22 needs to be removed from the motor during normal servicing or maintenance, there is no need to replace the winding 21 during each servicing operation. As a result, the servicing operation can be achieved more efficiently, requiring the replacement of fewer parts. Clearly, where the winding 21 does require replacement, then once the module has been removed, removal and replacement of the remainder of the brake assembly can be achieved easily.

Figure 3:
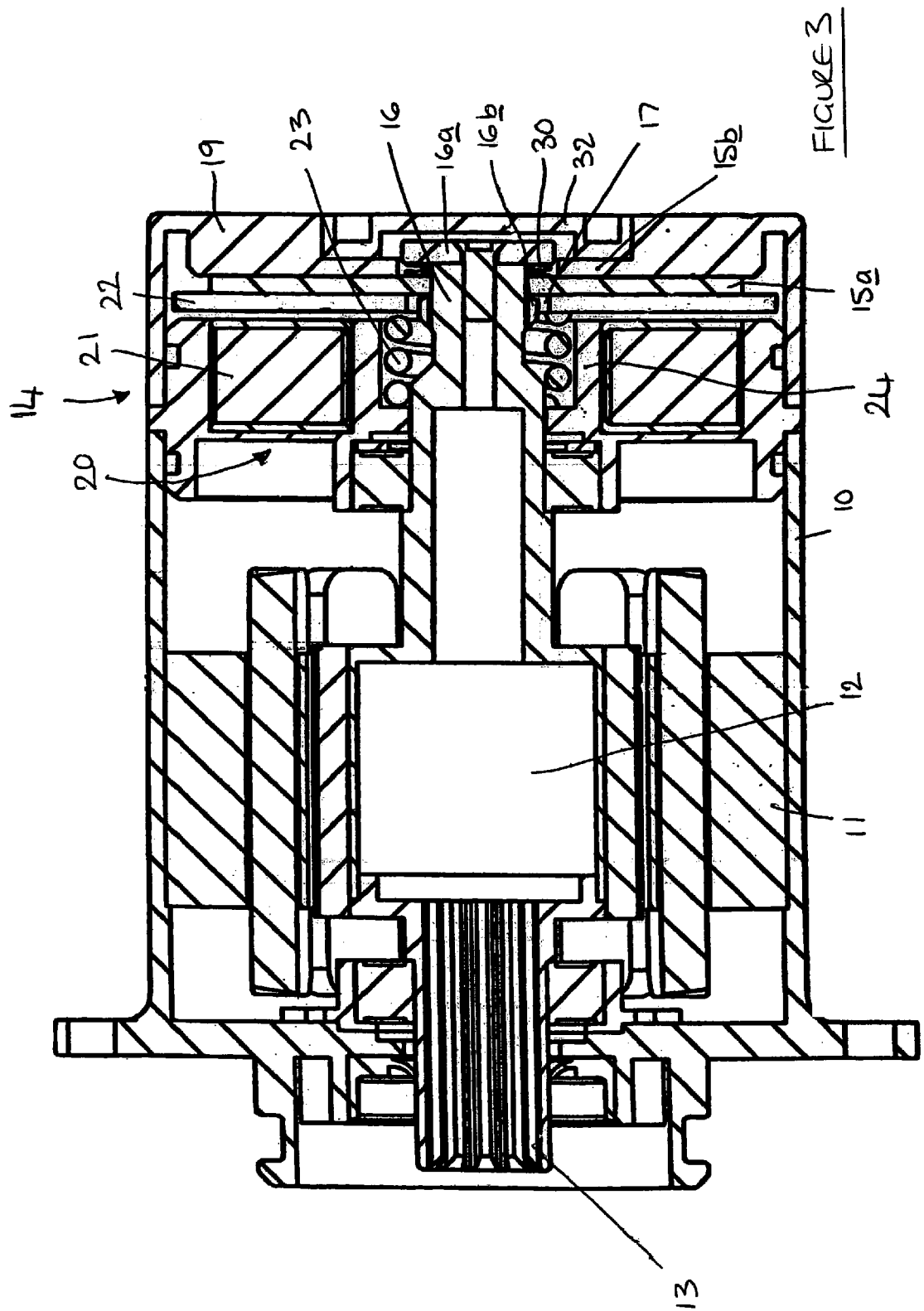
FIG. 3 is a sectional view illustrating an alternative embodiment of the motor and a brake assembly of the invention.

FIG. 3 shows an alternative embodiment of the invention, in which similar parts to those shown in FIGS. 1 and 2 are denoted with the same reference numerals. In this embodiment of the invention, the brake assembly 14 comprises a first brake element in the form of a brake disc or plate 15a which is keyed to the rotor shaft 16 through the spline arrangement 17. The spline arrangement 17 is arranged such that the brake disc 15a is rotatable with the shaft 16 and is free to move axially relative to the shaft 16 by a predetermined, limited distance. The brake assembly 14 also includes a second brake element 15b, the brake element 15b forming part of the cap 19. The cap 19 cooperates with a closure member 32 which is removable from the cap 19 to enable the brake disc 15a and the brake element 15b to be accessed, if desired.

Typically, the brake element 15b may be formed by machining the cap 19 such that the brake element 15b forms an integral part of the cap 19. It will be appreciated, however, that the brake element 15b may be a separate component which is mounted upon the cap 19 such that relative rotation between the brake element 15b and the cap 19 is prevented.

At its end remote from the rotor 12, the shaft 16 includes an abutment member in the form of a flange 16a which is rotatable with the shaft 16, a surface of the flange 16a being in abutment with one end of a biasing spring 30. The other end of the biasing spring 30 is in abutment with the rotatable brake disc 15a, the spring 30 being mounted such that, in use, it rotates with the shaft 16. The shaft 16 is also provided with a stop member 16b, the spring 30 applying a biasing force to the rotatable brake disc 15a which serves to urge the brake disc 15a towards the stop member 16b so as to limit axial movement of the brake disc 15a. The stop member 16b is conveniently formed on the shaft 16 by cutting the spline arrangement 17 across two diameters thereof so as to provide a full spline and a shoulder on the shaft 16 which forms the stop member 16b. The spring force of the spring 30 acts against the spring force of the spring 23, but provides only limited resistance thereto. The spring force of the spring 30 is, however, sufficient to overcome the weight of the rotatable brake disc 15a.

The brake disc 15a and the brake element 15b are conveniently constructed from a non-magnetic alloy, for example beryllium copper, to which a surface coating has been applied to increase the coefficient friction of the brake elements 15a, 15b, as described previously. Preferably, the surface coating is applied to both surfaces of the brake disc 15a, the surface of the brake element 15b facing the brake disc 15a and the surface of the armature 22 facing the brake disc 15a.

Operation of the arrangement in FIG. 3 is achieved in a similar manner to the embodiment shown in FIGS. 1 and 2. In use, with the winding 21 deenergized, the spring 23 biases the armature 22 to apply a compressive load to the brake disc 15a and, as the force due to the spring 23 exceeds the opposing force due to the spring 30, the brake disc 15a is urged to move axially against the brake element 15b. The compressive load applied to the brake disc 15a therefore applies a braking force to the shaft 16, countering rotation thereof, and hence to the rotor 12 of the motor. Energization of the winding 21 attracts the armature 22 towards the winding 21 countering the effect of the spring force due to the spring 23. As a result, the magnitude of the compressive load applied to the brake disc 15a is reduced. A reduction in the compressive load causes the brake disc 15a to move away from the brake element 15b due to the force of the spring 30, axial movement of the brake disc 15a away from the brake element 15b being terminated when the brake disc 15a abuts the stop member 16b. As the brake disc 15a separates from the brake element 15b, the braking force applied to the shaft 16 and the rotor 12 is removed such that rotation of the shaft 16 is permitted.

If the motor is oriented such that the axis of the shaft 16 is vertically aligned, the provision of the spring 30 ensures the brake disc 15a is prevented from pressing against the brake element 15b under the influence of gravity. The provision of the stop 16b ensures that axial movement of the brake disc 15a is limited such that, under such circumstances, the force due to the spring 30 does not cause contact between the surface of the brake disc 15a and the armature 22. Thus, when the winding 21 is energised to remove the braking force applied to the shaft 16 and it is desired for the rotor 12 to rotate freely, any drag force which would otherwise occur due to contact between the brake disc 15a and the brake element 15b is prevented. Due to the increased coefficient friction of the brake elements 15a, 15b, it is particularly desirable to avoid any such contact between the surfaces of the elements 15a, 15b at points in the operation of the motor in which the brake is not being applied as such contact would impede operation of the motor and generate additional heat. Thus, the brake assembly is capable of operating in any orientation and, additionally, operation will not be effected by any vibration caused by operation of the motor.

Although not shown in the brake arrangements in FIGS. 1 and 2, it is envisaged that these arrangements may also be adapted to avoid contact between the surfaces of the brake discs when the brake is not being applied. This may be achieved, in use, by providing springs between the brake discs 15 such that upon energization of the winding 21, the springs provided between the discs 15 urge the discs 15 apart from one another, thus ensuring that contact between the discs 15 does not occur when the winding 21 is energized. It is thought, however, that in some applications, the discs 15 will separate from one another due to the vibrations caused by the operation of the motor, and hence the provision of such springs may not be necessary.

It will be appreciated that the provision of the removable closure member 32 in the embodiment shown in FIG. 3 permits the brake assembly 14 to be accessed without the need to remove the cap 19, if desired.

It will further be appreciated that the embodiment of the invention shown in FIG. 3 is particularly suitable for use in applications in which the motor is oriented such that the brake disc 15a will be urged towards the brake element 15b under the influence of gravity at points in the operation of the motor where no braking force is required.

Although in the description hereinbefore the brake is applied other than when the winding 21 is energised, it will be appreciated that arrangements are possible in which the application of the brake occurs where the winding is energised. It will further be appreciated that, although the description relates to a brake for a motor for driving a door or hatch, the invention is suitable for use in other applications.

What is claimed is:

1. A brake assembly for a motor, and suitable for use in aerospace applications, the brake assembly comprising a stack of brake elements, at least one of which is rotatable with an output shaft of the motor, in use, and at least one of which is non-rotatable relative to a housing, and an actuator arrangement for controlling the magnitude of the compressive load applied to the brake elements, wherein the brake elements are provided, at least in part, with an applied surface coating of tungsten carbide which raises and maintains the coefficient of friction of the brake elements to a value greater than 0.5, and can withstand high temperatures of about 1000° C. generated upon repeated use of the brake assembly.

2. The brake assembly as claimed in claim 1, wherein the coefficient of friction falls within the range 0.5 to 0.6.

3. The brake assembly as claimed in claim 1, wherein the surface coating forms a layer of thickness falling within the range of 0.64 mm to 1.27 mm.

4. The brake assembly as claimed in claim 1, wherein the stack of brake elements takes the form of a first brake element which is rotatable with the output shaft of the motor, in use, and a second brake element which is non-rotatable relative to the housing.

5. The brake assembly as claimed in claim 4, wherein the second brake elements forms part of a cap forming part of the housing.

6. The brake assembly as claimed in claim 4, further comprising an arrangement for preventing contact between the first and second brake elements when the actuator arrangement is actuated.

7. The brake assembly as claimed in claim 6, wherein the arrangement for preventing contact between the first and second brake elements includes a secondary spring for biasing the first brake element away from the second brake element, the second spring providing a biasing force which exceeds the weight of the first brake element.

8. The brake assembly as claimed in claim 7, wherein the actuator arrangement comprises an electromagnetic actuator arranged to act against a primary spring, the spring force due to the secondary spring being sufficient to overcome the weight of the first brake element but being less than the spring force due to the primary spring.

9. The brake assembly as claimed in claim 8, wherein the arrangement for preventing contact between the first and second brake elements further comprises a stop member arranged to limit axial movement of the first brake element relative to an armature forming part of the actuator means.

10. The brake assembly as claimed in claim 9, wherein the stop member takes the form of a shoulder provided on a rotor shaft which is rotatable with the output shaft of the motor.

11. The brake assembly as claimed in claim 10, wherein the rotor shaft is provided with an abutment member, the second spring being located between the abutment member and the first brake element.

12. The brake assembly as claimed in claim 1, wherein at least one of the brake elements takes the force of a brake disc.

13. The brake assembly as claimed in claim 1, wherein the actuator arrangement comprises an electromagnetic actuator arranged to act against a primary spring.

14. The brake assembly as claimed in claim 13, wherein the electromagnetic actuator includes an actuator winding located such that the brake elements are accessible without requiring removal of the actuator winding from the motor.

15. A brake assembly for a motor, the brake assembly comprising a stack of brake elements, at least one of which is rotatable with an output shaft of the motor, in use, and at least one of which is non-rotatable relative to a housing, and an actuator arrangement for controlling the magnitude of the compressive load applied to the brake elements, wherein the brake elements are provided, at least in part, with a coating which raises the coefficient of friction of the brake elements to a value greater than 0.2, wherein the stack of brake elements takes the form of a first brake element which is rotatable with the output shaft of the motor, in use, and a second brake element which is non-rotatable relative to the housing, the brake assembly further comprising an arrangement for preventing contact between the first and second brake elements when the actuator arrangement is actuated, wherein the arrangement for preventing contact between the first and second brake elements includes a secondary spring for biasing the first brake element away from the second brake element, the secondary spring providing a biasing force which exceeds the weight of the first brake element, wherein the actuator arrangement comprises an electromagnetic actuator arranged to act against a primary spring, the spring force due to the secondary spring being sufficient to overcome the weight of the first brake element but being less than the spring force due to the primary spring, wherein the arrangement for preventing contact between the first and second brake elements further comprises a stop member arranged to limit axial movement of the first brake element relative to an armature forming part of the actuator means, wherein the stop member takes the form of a shoulder provided on a rotor shaft which is rotatable with the output shaft of the motor, and wherein the rotor shaft is provided with an abutment member, the secondary spring being located between the abutment member and the first brake element.

* * * * *

UNITED STATES PATENT AND TRADEMARK OFFICE
CERTIFICATE OF CORRECTION

PATENT NO. : 7,641,026 B1 Page 1 of 1
APPLICATION NO. : 09/595201
DATED : January 5, 2010
INVENTOR(S) : Hayward et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2395 days.

Signed and Sealed this

Sixteenth Day of November, 2010

David J. Kappos
*Director of the United States Patent and Trademark Office*